Figure 1:
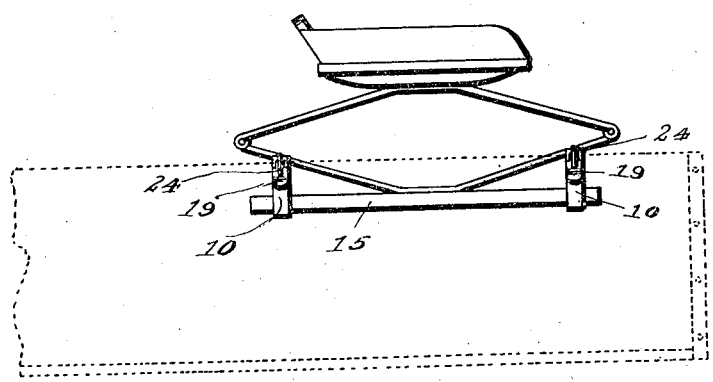

A. M. ALLEN.
SEAT HOOK.
APPLICATION FILED JAN. 22, 1919.

1,353,701.                                    Patented Sept. 21, 1920.

Witnesses
R. A. Thomas

Inventor
A. M. Allen

By Victor J. Evans
Attorney

UNITED STATES PATENT OFFICE.

ARTHUR M. ALLEN, OF HOPE, ARKANSAS.

SEAT-HOOK.

1,353,701.　　　　Specification of Letters Patent.　　Patented Sept. 21, 1920.

Application filed January 22, 1919. Serial No. 272,540.

*To all whom it may concern:*

Be it known that I, ARTHUR M. ALLEN, a citizen of the United States, residing at Hope, Route 1, in the county of Hempstead and State of Arkansas, have invented new and useful Improvements in Seat-Hooks, of which the following is a specification.

This invention relates to a seat hook or device for supporting a wagon seat, and the object is to provide a form of bracket or hook which may be caused to engage the upper edge of a wagon body, and which shall include a pivoted and spring held member or clamp for retaining the bracket or hook in position, said bracket supporting the seat, which may be of usual construction.

With the foregoing and other objects in view, the invention consists in the novel construction, combination and arrangement of elements hereinafter described and claimed.

Figure 2:
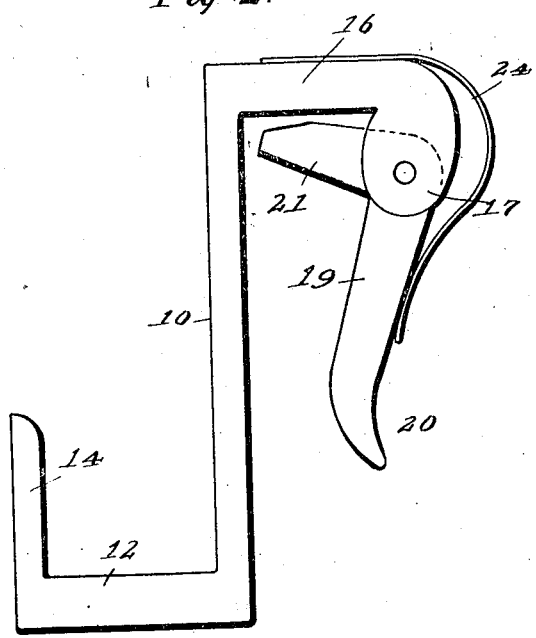
Figure 3:
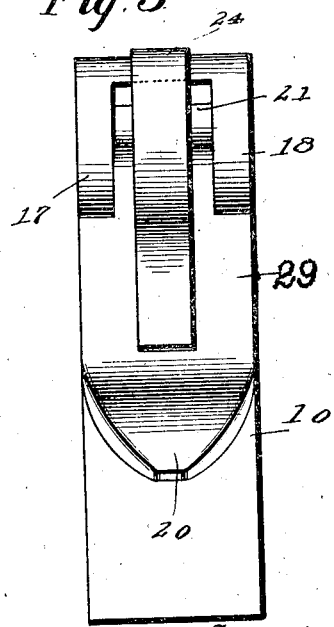

In the drawings,

Figure 1 is a view of the device in elevation, and in operative position, a portion of a wagon body being shown in dotted lines, Figs. 2 and 3 are enlarged views of the seat hook, in elevation, the views being taken from different angles.

In carrying out my invention I employ a device or a plurality of devices suitable for use in supporting a seat, which may be of usual construction, within a wagon body, this device being so constructed that it forms in itself a clamping member.

The hook portion of the device includes a vertically extending member 10, a horizontally extending element 12 and an upwardly extending element 14, the portion 12 directly engaging the transverse element 15 carried by the under side of the seat.

The vertical member 10 includes an outwardly extending device 16 provided with downwardly extending ears 17 and 18 spaced apart in the manner shown.

A pivoted clamping member is mounted between these ears and includes an arm 19, one end of which may be outwardly deflected as shown at 20, the other end of the arm being designated 21 and constituting a stop serving to engage the outwardly extending device 16 before mentioned thereby limiting the movement of the pivoted member.

A spring 24 is secured to the device 16 and extends downwardly, the lower end thereof being in contact with the arm 19 of the pivoted member, thereby forcing said pivoted member toward the vertical member 10 and into engagement with the side of the wagon body.

Engagement between the upper edge of the wagon body and the shorter arm of the pivoted member produces a positive clamping effect between said member and the side of the wagon body, thereby not only securely supporting the seat but preventing any rattling or undue vibration.

What is claimed is:

1. The combination with a seat hook, of a pivoted member including an arm connected with the hook and projecting above and engaging the edge of a wagon body, and an arm brought into positive engagement with the side of the body under pressure exerted on the seat and transmitted through the arm first named.

2. The combination with a seat hook, of an angular pivoted member including an arm connected with the hook and projecting above and engaging the edge of a wagon body and an arm forced into positive engagement with the side of the body under pressure resulting from contact between the edge portion and the arm first named, and a spring bearing against the second named arm.

In testimony whereof I affix my signature.

ARTHUR M. ALLEN.